(12) United States Patent
Berryhill

(10) Patent No.: US 6,454,111 B1
(45) Date of Patent: Sep. 24, 2002

(54) COMPOST RECEPTACLE

(75) Inventor: Robert A. Berryhill, Greensboro, NC (US)

(73) Assignee: Two One One Partners, Greensboro, NC (US)

(*) Notice: Subject to any disclaimer, the term of this patent is extended or adjusted under 35 U.S.C. 154(b) by 0 days.

(21) Appl. No.: 09/927,872

(22) Filed: Aug. 13, 2001

(51) Int. Cl.⁷ .................................................. B65D 9/00
(52) U.S. Cl. ........................ 217/13; 220/668; 220/908; 220/913
(58) Field of Search ............................... 220/4.28, 4.33, 220/668, 682, 691, 908, 913; 217/13, 45

(56) References Cited

U.S. PATENT DOCUMENTS

| | | | |
|---|---|---|---|
| 3,708 A | * | 8/1844 | Vestal .................... 220/913 X |
| 4,050,604 A | * | 9/1977 | Flanders ................... 217/13 X |
| 4,271,975 A | * | 6/1981 | Ketner et al. ........... 220/668 X |
| 5,429,945 A | * | 7/1995 | Shain ..................... 220/908 X |

OTHER PUBLICATIONS p. 156 of Trane Air Conditioning Manual (undated).

* cited by examiner

Primary Examiner—Steven Pollard

(57) ABSTRACT

A receptacle for containing compost is provided which can be easily assembled and disassembled as needed. The receptacle is formed of durable materials creating an attractive appearance to the yard or garden. Metal brackets form the corners and define angularly positioned slots for receiving wooden slats which provide the side walls. The slats can later be removed when compost is needed.

15 Claims, 2 Drawing Sheets

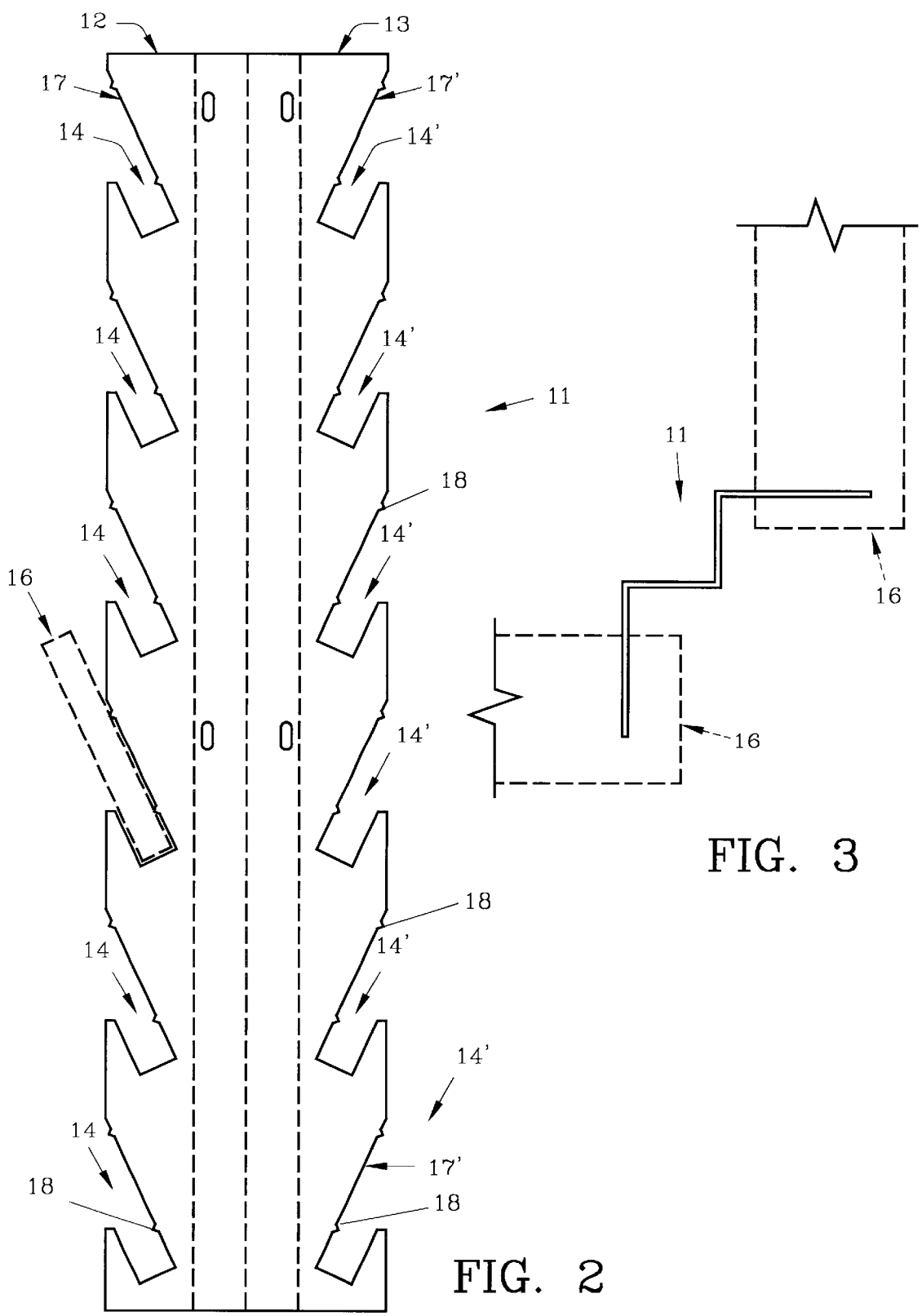

COMPOST RECEPTACLE

FIELD OF THE INVENTION

The invention herein pertains to outdoor receptacles and particularly pertains to a container for retaining organic matter to be used for fertilizing plants.

DESCRIPTION OF THE PRIOR ART AND OBJECTIVES OF THE INVENTION

In recent years homeowners and others have increasingly discovered the advantages of readily available organic materials for fertilizing garden plants and the like. Leaves, grass clippings and other organic waste can generally be easily harvested and kept for later use. However, conventional methods of storing such organic matter has proven troublesome. Wind gusts and rain often scatter piles of open organic matter. Also, conventional "compost" piles are unsightly and detract from the yard or garden appearance.

Thus, with the problems and disadvantages of conventional methods of storing organic materials, the present invention was conceived and one of its objectives is to provide a receptacle for containing decaying organic matters for later use on yard and gardens.

It is still another objective of the present invention to provide a receptacle which is durable and weather-resistant for long periods of use.

It is still another objective of the present invention to provide a receptacle which includes metal brackets which support wooden slats angularly placed thereon.

It is yet another objective of the invention to form a compost receptacle which can be inexpensively purchased, easily assembled and effectively used.

Various other objectives and advantages of the present invention will become apparent to those skilled in the art as a more detailed description is set forth below.

SUMMARY OF THE INVENTION

The aforesaid and other objectives are realized by providing a receptacle which can be easily assembled and disassembled by homeowners and others with ordinary hand tools. The receptacle has metal corner brackets which are slotted to accommodate wooden slats. The receptacle forms a square configuration with slatted side walls. Nibs positioned in the slots of the metal brackets grip the wooden slats to provide rigidity and stability to the receptacle. Organic matter such as leaves, grass clippings and the like can be placed within the receptacle and later, after the organic matter decays, one or more bottom slats can be removed along one side for easy access to the bottom (oldest) organic material therein.

BRIEF DESCRIPTION OF THE DRAWINGS

FIG. 2 illustrates a front elevational view of one of the metal brackets as stamped or cut from a planar sheet but before shaping and bending; and FIG. 3 depicts a top view of a finished metal bracket as shown in FIG. 2 after final bending has occurred.

DETAILED DESCRIPTION OF THE PREFERRED EMBODIMENT AND OPERATION OF THE INVENTION

Figure 1:
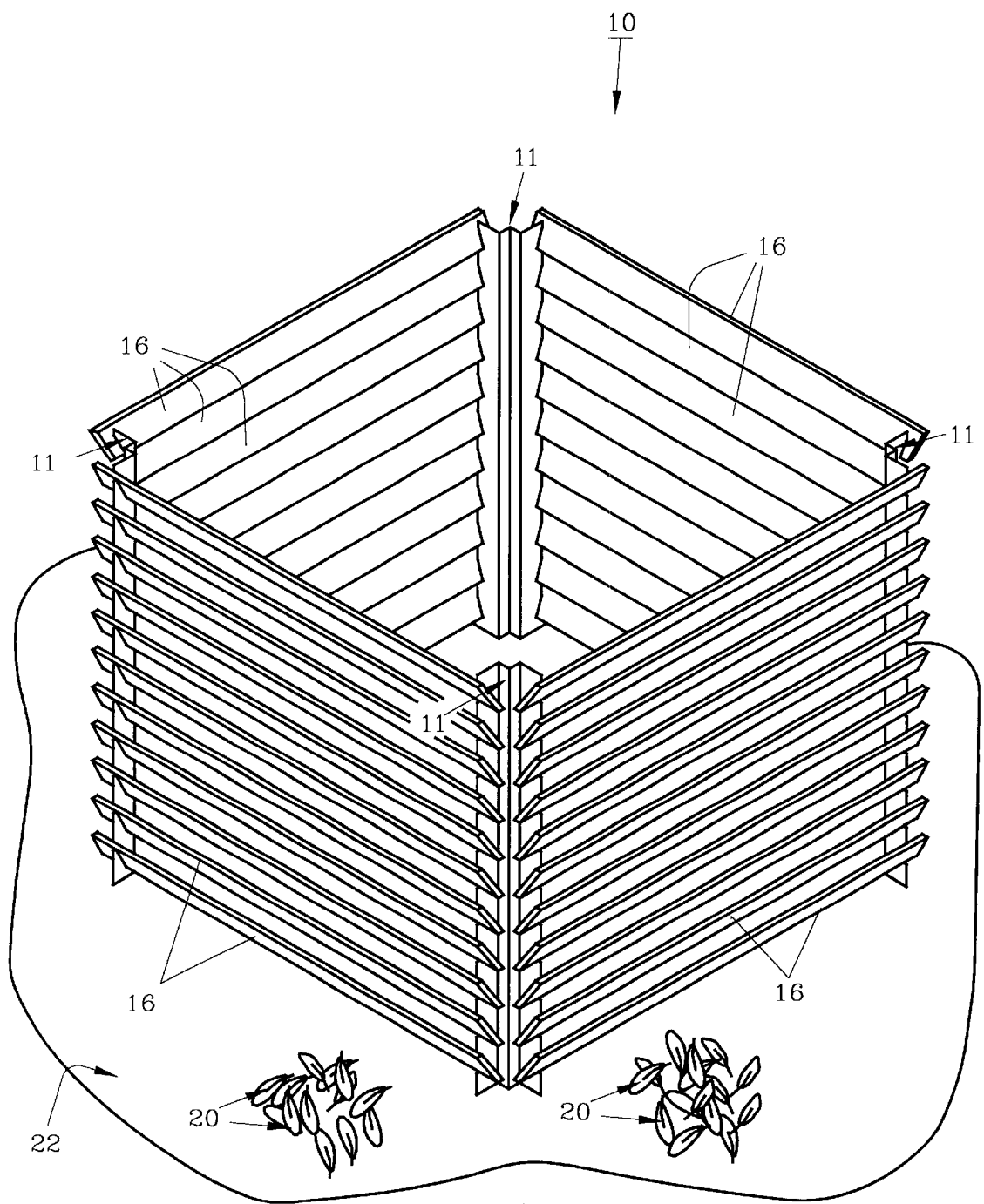
FIG. 1 demonstrates a front, top perspective view of the preferred receptacle of the invention.

For a better understanding of the invention, turning now to the drawings, FIG. 1 shows preferred compost receptacle 10 for storing leaves, grass and other organic matter to allow decay for later use. Receptacle 10 can be assembled and positioned in a yard or garden for receiving various organic materials for subsequent removal to supply natural nutrients to flowers, plants or the like. Receptacle 10 is preferably about thirty-six inches tall (91.44 cms), forty inches wide (101.60 cms) and forty inches long (101.60 cms) to thereby form a square container. Receptacle 10 is formed with preferably four metal brackets 11, which are cut with dies or lasers as is standard from a 14 gauge galvanized planar steel and then bent by conventional means to a "w-shape" as shown in FIG. 3. Brackets 11 preferably demonstrate two vertical columns 12, 13 in FIG. 2 each having six slots 14, 14', each of which are angled at preferably 25° for receiving wooden slats 16 therein. As slats 16 are spaced apart, adequate air flow is available for the organic material, such as leaves 20, when placed therein.

Slats 16 as seen in FIGS. 1 and 3 are preferably formed of wood which has been pressure treated as used in outdoor decking and the like. Slats 16 are standard approximately one-inch (2.5 cms) thick and approximately four inches (10.16 cms) wide, cut to a length of approximately forty inches (101.60 cms). In order to stabilize slats 16 within slots 14, 14', nibs 18 in FIG. 2 are provided along inside walls 17, 17' of respectively, slots 14, 14'. Nibs 18 penetrate wooden slat 16 to grip the same and stabilize receptacle 10 during use.

Receptacle 10 can be purchased by a consumer and can be quickly assembled without training or special tools. In use, receptacle 10 is assembled, placed on lawn 22 (FIG. 1) or near a garden, and filled with leaves 20 and other organic matter for decaying purposes. The louvered sides of receptacle 10 provide for airflow therethrough to increase the decaying of the organic materials while containing the same during rainy, windy or other inclement weather conditions. As desired, the decaying organic content is readily available by removing one or two lower slats 16 along one side, raking out organic material for placement around, for example, a plant, and then replacing removed slats 16. As needed, receptacle 10 can be easily, manually disassembled for reassembly at another location as desired.

The illustrations and examples provided herein are for explanatory purposes and are not intended to limit the scope of the appended claims.

I claim:

1. A compost receptacle comprising an elongated bracket, said bracket defining a plurality of slots, a plurality of nibs, said nibs positioned on said bracket proximate said slots, a plurality of slats, said slats positioned in said slots wherein said nibs engage said slats to grip the same.

2. The compost receptacle of claim 1 wherein said bracket is vertically positioned.

3. The compost receptacle of claim 1 wherein said bracket has a w-shaped cross-section.

4. The compost receptacle of claim 1 wherein said bracket is formed of metal.

5. The compost receptacle of claim 1 wherein said slats are made of wood.

6. The compost receptacle of claim 5 wherein said wooden slats have been pressure treated.

7. The compost receptacle of claim 1 wherein said plurality of slats comprise two vertical columns of slats.

8. A compost receptacle comprising a plurality of elongated brackets, each of said brackets defining a slotted column, each of said slots of said column for receiving a slat therein, each of said brackets further comprising a plurality of nibs, said nibs positioned on said brackets proximate said slots for engaging said slats whereby said slats form sides of said compost receptacle.

9. The compost receptacle of claim 8 wherein said plurality of brackets comprise four brackets.

10. The compost receptacle of claim 8 wherein two nibs are positioned proximate each of said slots.

11. The compost receptacle of claim 8 wherein said slats are formed from wood.

12. The compost receptacle of claim 8 wherein said brackets are formed from metal.

13. The compost receptacle of claim 8 wherein said slots are angularly disposed on said brackets.

14. The compost receptacle of claim 8 wherein said brackets each form a w-shaped cross-section.

15. The compost receptacle of claim 8 wherein each of said brackets define a pair of slotted columns.

* * * * *